(12) United States Patent
Laucius et al.

(10) Patent No.: US 7,676,553 B1
(45) Date of Patent: Mar. 9, 2010

(54) INCREMENTAL WEB CRAWLER USING CHUNKS

(75) Inventors: Andrew S. Laucius, Seattle, WA (US); Darren A. Shakib, North Bend, WA (US); Eytan D. Seidman, Seattle, WA (US); Jonathan Forbes, Bellevue, WA (US); Keith A. Birney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 10/750,011

(22) Filed: Dec. 31, 2003

(51) Int. Cl.
*G06F 15/16* (2006.01)
(52) U.S. Cl. .................................... 709/219
(58) Field of Classification Search ......... 709/217–219, 709/223, 224, 227, 245
See application file for complete search history.

(56) References Cited

U.S. PATENT DOCUMENTS

| | | | |
|---|---|---|---|
| 6,182,085 B1* | 1/2001 | Eichstaedt et al. | 707/104.1 |
| 6,263,364 B1* | 7/2001 | Najork et al. | 709/217 |
| 6,526,440 B1 | 2/2003 | Bharat | |
| 6,529,903 B2 | 3/2003 | Smith et al. | |
| 6,615,209 B1 | 9/2003 | Gomes et al. | |
| 6,658,423 B1 | 12/2003 | Pugh et al. | |
| 6,678,681 B1 | 1/2004 | Brin | |
| 7,058,727 B2* | 6/2006 | Dingsor et al. | 709/245 |
| 7,213,198 B1* | 5/2007 | Harik | 715/501.1 |
| 7,305,610 B1* | 12/2007 | Dean et al. | 715/205 |
| 2002/0123988 A1 | 9/2002 | Dean et al. | |
| 2002/0133481 A1 | 9/2002 | Smith et al. | |
| 2003/0221014 A1* | 11/2003 | Kosiba et al. | 709/231 |
| 2004/0030683 A1* | 2/2004 | Evans et al. | 707/3 |

(Continued)

FOREIGN PATENT DOCUMENTS

EP    1120717 A2 *    8/2001

OTHER PUBLICATIONS

Hadrien Bullot, et al., A Data-Mining Approach for Optimizing Performance of an Incremental Crawler, Proceedings of the IEEE/WIC, Oct. 13-17, 2003, 6 pages.

(Continued)

*Primary Examiner*—Benjamin R Bruckart
*Assistant Examiner*—Scott M Sciacca
(74) *Attorney, Agent, or Firm*—Shook, Hardy & Bacon L.L.P.

(57) ABSTRACT

A system and method facilitating incremental web crawl(s) using chunk(s) is provided. The system can be employed, for example, to facilitate a web-crawling system that crawls (e.g., continuously) the Internet for information (e.g., data) and indexes the information so that it can be used as part of a web search engine.

The system facilitates incremental re-crawls and/or selective updating of information (e.g., documents) using a structure called a chunk to simplify the process of an incremental crawl. A chunk is a set of documents that can be manipulated as a set (e.g., of up to 65,536 (64K) documents). "Document" refers to a corpus of data that is stored at a particular URL (e.g., HTML, PDF, PS, PPT, XLS, and/or DOC Files etc.)

A chunk is created by an indexer. The indexer can place into a chunk documents that have similar property(ies). These property(ies) include but are not limited to: average time between change and average importance. These property(ies) can be stored at the chunk level in a chunk map. The chunk map can then be employed (e.g., on a daily basis) to determine which chunk(s) should be re-crawled.

20 Claims, 8 Drawing Sheets

U.S. PATENT DOCUMENTS

2004/0225963 A1* 11/2004 Agarwal et al. ............. 715/530
2007/0094255 A1* 4/2007 Acharya et al. ................ 707/5

OTHER PUBLICATIONS

J.L. Wolf, et al., Optimal Crawling Strategies for Web Search Engines, WWW2002, May 7-11, 2002 pp. 136-147, Honolulu Hawaii.

Marc Najork, et al., High Performance Web Crawling, Handbook of Massive Data Sets, Sep. 26, 2001, pp. 1-20.

Brian D. Davidson, Topical Locality in the Web, Rutgers University, 2000, pp. 1-8.

Junghoo Cho, et al., The evolution of the Web and Implications for an Incremental Crawler, Stanford University, 2000, pp. 1-21.

Sergey Brin, et al., The Anatomy of a Large-Scale Hypertextual Web Search Engine, Stanford University, 1998.

Andrei Z. Broder, Some applications of Rabin's fingerprinting method, Sequences II: Methods in Communications, Security, and Computer Science, Springer-Verlag, 1993, pp. 1-10.

* cited by examiner

```
HEADER:
    4 BYTE MAGIC NUMBER
    4 BYTE FILE HEADER SIZE
    4 BYTE FILE VERSION SIZE
    4 BYTE DOCUMENT HEADER SIZE
    4 BYTE COUNT OF INDEX ELEMENTS
    4 BYTE INDEX ELEMENT SIZE
    ARRAY OF INDEX OF OFFSETS
HEADER

DOCUMENT:
    16 BYTE IP ADDRESS FROM WHERE DOCUMENT WAS DOWNLOADED
(IPV6 SUPPORT)
    8 BYTE TIME DOWNLOADED (FILETIME)
    8 BYTE DURATION OF DOWNLOAD (FILETIME)
    4 BYTE CRC-32 OF UNCOMPRESSED DOC
    4 BYTE COUNT OF BYTES IN THE UNCOMPRESSED DOC
    4 BYTE COUNT OF BYTES IN THE COMPRESSED DOC
    2 BYTE COUNT OF BYTES IN THE URL
    1 BYTE LINK DEPTH
    1 BYTE FLAGS (USED TO DENOTE IF THE DOC IS COMPRESSED)
    4 BYTE COUNT OF BYTES FOR ADDITIONAL METADATA
    URL
    ADDITONAL METADATA
    RAW DOCUMENT WITH HTTP HEADERS MODIFIED ONLY BY THE
REMOVAL OF "TRANSFER CODING: CHUNKED"
DOCUMENT
```

FIG. 3

```
TYPE ID
URL
HASH OF URL
CHUNK ID (CHUNKS ARE EXPLAINED LATER)
RANK (STATIC RANK FOR A PAGE)
LINK DEPTH
FINGERPRINT (KEY USED TO TELL IF PAGE HAS CHANGED)
HASH OF SOURCE URL OF ANCHOR TEXT
ANCHOR TEXT STRING
```

INCREMENTAL WEB CRAWLER USING CHUNKS

TECHNICAL FIELD

The present invention relates generally to web crawler(s), and, more particularly, to web crawler(s) employing chunks of documents to facilitate re-crawling.

BACKGROUND OF THE INVENTION

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Typically, the information available via web sites and servers is accessed via a web browser executing on a web client (e.g., a computer). For example, a web user can deploy a web browser and access a web site by entering the web site Uniform Resource Locator (URL) (e.g., a web address and/or an Internet address) into an address bar of the web browser and pressing the enter key on a keyboard or clicking a "go" button with a mouse. The URL typically includes four pieces of information that facilitate access: a protocol (a language for computers to communicate with each other) that indicates a set of rules and standards for the exchange of information, a location to the web site, a name of an organization that maintains the web site, and a suffix (e.g., com, org, net, gov and edu) that identifies the type of organization.

In some instances, the user knows, a priori, the name of the site or server, and/or the URL to the site or server that the user desires to access. In such situations, the user can access the site, as described above, via entering the URL in the address bar and connecting to the site. However, in most instances, the user does not know the URL or the site name. Instead, the user employs a search engine to facilitate locating a site based on keywords provided by the user. In general, the search engine is comprised of executable applications or programs that search the contents of web sites and servers for keywords, and return a list of links to web sites and servers where the keywords are found. Basically, the search engine incorporates a web "crawler" (aka, a "spider" or a "robot") that retrieves as many documents as possible at their associated URL. This information is then stored such that an indexer can manipulate the retrieved data. The indexer reads the documents, and builds an inverted index based on words. Respective search engines generally employ a proprietary algorithm to create indices such that meaningful results are returned for a query.

Thus, a web crawler is crucial to the operation of search engines. In order to provide current and up-to-date search results, the crawler must constantly search the web to find new web pages, to update old web page information, and to remove deleted pages. The number of web pages found on the Internet is astronomical. It therefore requires that a web crawler be extremely fast. Since most web crawlers gather their data by polling servers that provide the web pages, a crawler must also be as unobtrusive as possible when accessing a particular server. Otherwise, the crawler can absorb all of the server's resources very quickly and cause the server to shut down. Generally, a crawler identifies itself to a server and seeks permission before accessing a server's web pages. At this point, a server can deny access to an abusive crawler that steals all of the server's resources. A web page hosting server typically benefits from search engines, because they allow users to find their web pages more easily. Thus, most servers welcome crawlers, as long as they do not drain all of the server's resources, so that the server's contents can be better exploited by users.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method of facilitating incremental web crawl(s) using chunk(s). The system can be employed, for example, to facilitate a web-crawling system that crawls (e.g., continuously) the Internet for information (e.g., data) and indexes the information so that it can be used as part of a web search engine. At least some of the information that is indexed needs to be continuously re-crawled in order for the system to maintain a fresh index.

The system facilitates incremental re-crawls and/or selective updating of information (e.g., documents) using a structure called a chunk to simplify the process of an incremental crawl. A chunk is a set of documents that can be manipulated as a set (e.g., of up to 65,536 (64K) documents). "Document" refers to a corpus of data that is stored at a particular URL (e.g., HTML, PDF, PS, PPT, XLS, and/or DOC Files etc.)

In accordance with an aspect of the present invention, a chunk is created by an indexer. The indexer receives documents from crawler(s). A particular crawler has a specific set of URL(s) for which it is responsible. The crawler(s) can have multiple partitions for load balancing purposes. The crawler(s) can employ a crawling scheme (e.g., a mapping between a domain and a crawler). For example, the indexer can be responsible for taking the crawled data, parsing it, removing markup, extracting URL's, extracting words, building the index and other related data structures for categorization and ranking.

The indexer can further place into a chunk documents that have similar property(ies). These property(ies) include but are not limited to: average time between change and average importance. These property(ies) can be stored at the chunk level in a chunk map. The chunk map can then be employed (e.g., on a daily basis) to determine which chunk(s) should be re-crawled.

The use of chunk(s) in doing an incremental crawl can have major advantages that improve freshness and simplify the process of an incremental crawl. For example, an advantage to the use of chunks is that the crawler(s) do not need to do any per document analysis to determine the frequency of when a document should be crawled. This has already been taken care of at the chunk level which allows for much faster processing of documents by the crawler(s). Another advantage is that the crawler(s) can constantly be in additive mode and do not need to determine whether a document should be in the index. Because a document is in a chunk and the chunk map has identified that the chunk be re-crawled implies that the document should be crawled. Yet another advantage to using chunks is that because no per document analysis is needed adding additional crawler(s) that have no knowledge of the system can be easily done. As long as a computer has an Internet connection and can fetch a document it can act as a crawler.

The crawler(s) receives document(s) from the Internet and provides the document(s) to the indexer. Thereafter, the indexer reviews the document(s) and determines to which chunk, if any, each of the document(s) belongs. If the document(s) do not belong to an existing chunk, the indexer can create one or more additional chunks. The indexer then stores the document(s) in the appropriate chunk. The indexer further updates the chunk map to identify the property(ies) associated with the chunk(s). For example, there can be tens of thousands of chunks across the system.

Yet another aspect of the present invention provides for the system to further includes a master control process and/or a re-crawl controller. The master control process can use the chunk map to make decisions. For example, the chunk map can include metadata associated with the chunks. The master control process can analyze this chunk metadata to determine which chunk(s), if any, to re-crawl. Further, the master control process can be responsible for facilitating distribution and/or balancing of chunk(s).

The re-crawl controller can be responsible for determining when to retire chunk(s) that are due to be re-crawled. For example, the re-crawl controller can make a re-crawl decision on chunks) based on information about the chunk, attempt not to starve any chunk(s) and/or attempt not to expire chunk(s) too fast so that the index becomes full of duplicates. The re-crawl controller can employ chunk metadata to make a decision on what should be retired (e.g., class, date created, and/or state).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 3 is a diagram of an exemplary file that a crawler passes to an index builder in accordance with an aspect of the present invention.

DETAILED DESCRIPTION OF THE INVENTION

Figure 1:
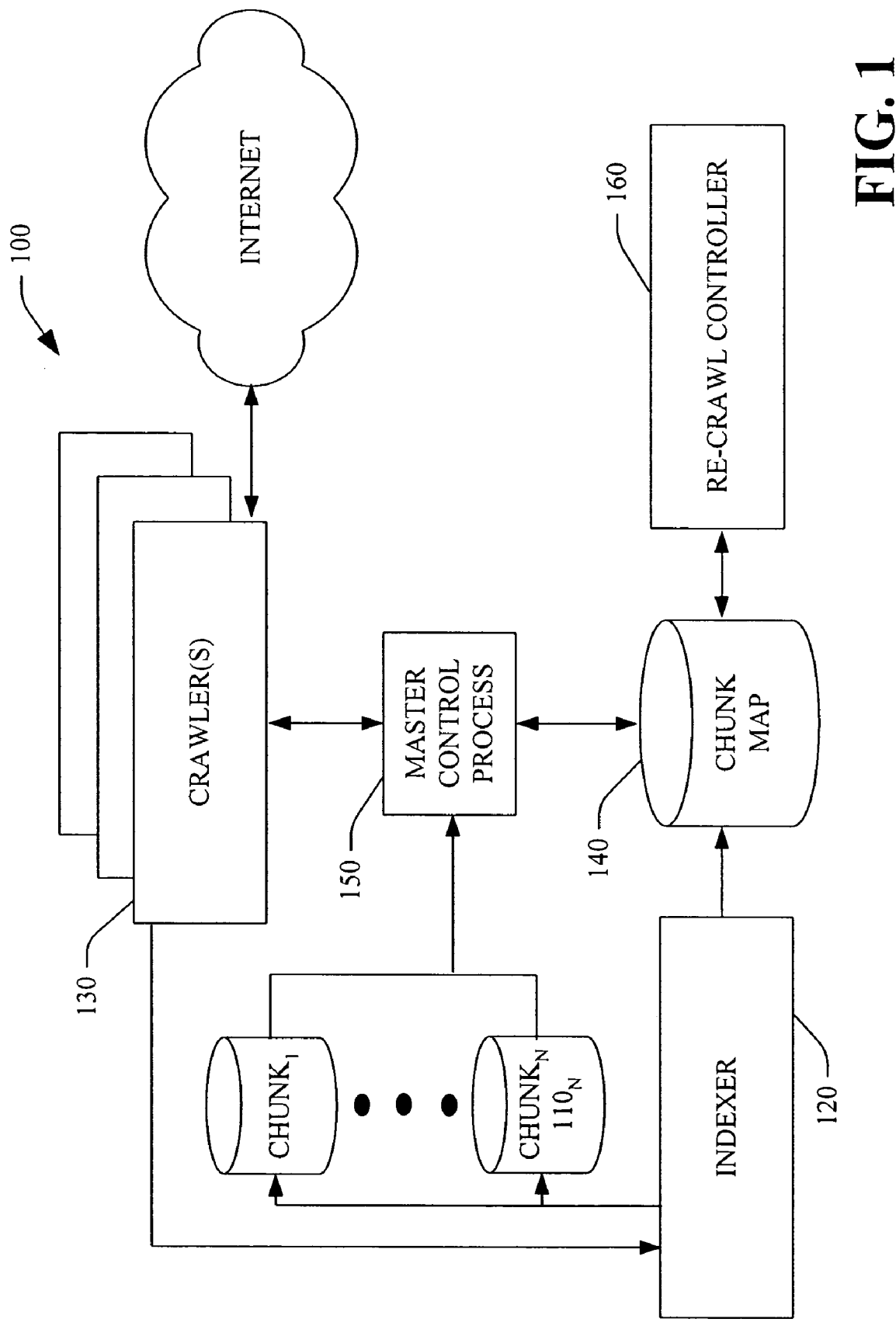
FIG. 1 is a block diagram of a system that facilitates incremental web crawl(s) in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Referring to FIG. 1, a system 100 that facilitates incremental web crawl(s) in accordance with an aspect of the present invention is illustrated. Web searching is a significant web user activity. In order to better answer user queries, a fresh index needs to be maintained, as a stale index can lead to incorrect and/or improper result(s).

The system 100 can be employed, for example, to facilitate a web-crawling system that crawls (e.g., continuously) the Internet for information (e.g., data) and indexes the information so that it can be used as part of a web search engine. At least some of the information that is indexed needs to be continuously re-crawled in order for the system to maintain a fresh index.

The system 100 facilitates incremental re-crawls and/or selective updating of information (e.g., documents) using a structure called a chunk 110 to simplify the process of an incremental crawl. A chunk 110 is a set of documents that can be manipulated as a set (e.g., of up to 65,536 (64K) documents). As used herein, "document" refers to a corpus of data that is stored at a particular URL (e.g., HTML, PDF, PS, PPT, XLS, and/or DOC Files etc.)

A chunk 110 is created by an indexer 120. The system 100 can include one or more chunks 110. The indexer 120 receives documents from crawler(s) 130. A particular crawler 130 has a specific set of URL(s) for which it is responsible. The crawler(s) can have multiple partitions for load balancing purposes. The crawler(s) 130 can employ a crawling scheme (e.g., a mapping between a domain and a crawler 130).

For example, the indexer 120 can be responsible for taking the crawled data, parsing it, removing markup, extracting URL's, extracting words, building the index and other related data structures for categorization and ranking.

The indexer 120 can further place into a chunk 110 documents that have similar property(ies). These property(ies) include but are not limited to: average time between change and average importance. These property(ies) can be stored at the chunk level in a chunk map 140. The chunk map 140 can then be employed (e.g., on a daily basis) to determine which chunk(s) 110 should be re-crawled.

The use of chunk(s) 110 in doing an incremental crawl can have major advantages that improve freshness and simplify the process of an incremental crawl. For example, an advantage to the use of chunks 110 is that the crawler(s) 130 do not need to do any per document analysis to determine the frequency of when a document should be crawled. This has already been taken care of at the chunk level which allows for much faster processing of documents by the crawler(s) 130. Another advantage is that the crawler(s) 130 can constantly be in additive mode and do not need to determine whether a document should be in the index. Because a document is in a chunk 110 and the chunk map 140 has identified that the chunk 110 be re-crawled implies that the document should be crawled. Yet another advantage to using chunks is that because no per document analysis is needed adding additional crawler(s) 130 that have no knowledge of the system can be easily done. As long as a computer has an Internet connection and can fetch a document it can act as a crawler 130.

Documents can be stored in the system 100 based, at least in part, upon a document ID. The document data and the URL can be retrieved with the Document ID. The crawler(s) 130 receives document(s) from the Internet and provides the document(s) to the indexer 120. Thereafter, the indexer 120 reviews the document(s) and determines to which chunk 110, if any, each of the document(s) belongs. If the document(s) do not belong to an existing chunk 110, the indexer 120 can create one or more additional chunks 110. The indexer 120 then stores the document(s) in the appropriate chunk(s) 110. The indexer 120 further updates the chunk map 140 to identify the property(ies) associated with the chunk(s) 110. For example, there can be tens of thousands of chunks 110 across the system 100.

Types of Chunk(s) 110

In one example, several types of chunk(s) 110 can exist in the system 100:

Index Chunks

Store the index (e.g., approximately 128 MB in size for approximately 64K URLs)

Are stored at least twice per index serving row, in addition to copies on the indexer 120

One copy per row will be active, while the other will be a backup

Rank Chunks

Store Static Ranks

Are found on the same machines as their corresponding Index Chunks

In one example, approximately 1 MB each

Content Chunks

Store cached copies of the contents of pages crawled

Are around 640 MB in size

Each content chunk is stored on two to three index servers (for the whole system, not per row) and may also be stored on one indexer 120.

Recrawl Chunks

Store the list of URLs to be re-crawled

Are around 1 MB in size

Are stored in at least one place (e.g., the same place as Content Chunks)

WebMap Chunks

Store a portion of the web map used for calculating static rank

Are around 16 MB in size

Exist on one ranker and one backup location somewhere

Optional Component(s) of System 100

The system 100 can, optionally, further include a master control process 150 and/or a re-crawl controller 160. The master control process 150 can serve as an interface between the crawler(s) 130, the chunk(s) 110, the chunk map 140 and the re-crawl controller 160. For example, the master control process 150 can be responsible for facilitating distribution and/or balancing of chunk(s) 110.

In one example, the master control process 150 maintains a known chunks table which stores the following information for every machine in the system:

What type of machine it is.

What chunks the machine has a copy of.

What chunks the machine should have a copy of.

What chunks the machine is actively serving

What chunks the machine should be actively serving

The crawler(s) 130, indexer 120, re-crawl controller 160 and/or other component(s) (not shown) can communicate with the master control process 150 to find out what it should do. For example, the master control process 150 can expose interface(s) for communication with component(s) of the system 100 such as:

MCP.GetChunkManifest( )

Returns the list of chunk(s) 110 a machine should have and where to get them

For Each Chunk:

When it was retired

When it was created

Can be called by any machine type (e.g., indexer 120, crawler(s) 130 and/or re-crawl controller 160)

MCP.GetActiveChunkList( )

Called by Index Servers

Gives an Index Server a list of the chunks that should be actively served by that machine MCP.GetFreeChunkIDs( )

Called by indexer 120

Gives the indexer 120 a range of chunk IDs to use in building new chunk(s) 110

ChunkIDs are 4 bytes

MCP.MarkChunkAsRetired( )

Called by indexer 120 when a new version of a chunk 110 is ready.

Causes the old chunk 110 to be retired and aged out of the system

MCP.QueryChunkLocation( )
    Used by FCS/Aggregator (not shown) to locate a Content Chunk 110 when retrieving Content Files to generate contextual descriptions
    The master control process 150 can employ interface(s) on the indexer 120 and/or index server(s) to keep track of the state of chunk(s) 110 and machine(s). For example:
        IndexBuilder.GetStoredChunkList( )
        Returns the list of chunk(s) 110 currently stored on the indexer 120
        IndexBuilder.GetActiveChunkList( )
        Returns the list of chunk(s) 110 actively being compiled by the indexer 120
        IndexBuilder.GetReservedChunkList( )
        Returns the list of chunk IDs that the indexer 120 has reserved for future use
        IndexServer.GetStoredChunkList( )
        Returns the list of chunk(s) 110 stored on the Index Server
        IndexServer.GetActiveChunkList( )
        Returns the list of chunk(s) 110 being actively served by the Index Server
    The master control process 150 can further facilitate movement of chunk(s) 110, for example, from a specific machine to another specific machine to handle the following scenarios:
        The movement of recently indexed data from the indexer 120 onto index server(s) (not shown);
        Rebalancing index servers after one goes down;
        Re-crawling page(s) previously crawled;
        Restoring the state of crawler(s) 130 after they've crashed
    In one example, in order to facilitate the movement of the proper chunk(s) 110 to the proper machines, the following strategy is employed:
        The master control process 150 keeps track of the state of chunk(s) 110 and machines across the system 100;
        Crawler(s) 130, indexer(s) 120, and index servers communicate with the master control process 150 to determine what chunk(s) 110 they should have, what chunk(s) 110 they should be using, and where to get any chunk(s) 110 they need; and,
        A file synchronization utility handles the actual movement of chunk(s) 110 from one place to another.
    Additionally, the master control process 150 can be responsible for maintaining the total number of chunk(s) 110 (e.g., at a fairly constant level). For example, for a particular chunk 110, the master control process 150 can track:
        Date Created
        Date Retired (left empty by index builder)
        Low Hash
        Hi Hash
        Class (describes relative crawl frequency) and/or
        State (active, retired etc.)
    As noted previously, the master control process 150 can facilitate chunk 110 distribution. Several chunk 110 distribution scenarios are: indexer chunk completion and index server failure Indexer Chunk Completion
    A very common chunk 110 distribution scenario is when an indexer 120 has completed a chunk 110 and has it is ready for distribution to Index Servers. In one example, the following sequence of events occurs:
        If the particular chunk 110 is a recrawled chunk 110, the indexer 120 calls MCP.MarkChunkAsRetired to retire the previous version of this chunk 110;
        The master control process 150 periodically polls the indexer 120, the indexer 120 pushes state onto the master control process 150 and/or the MarkChunkAsRetired call will triggers the poll;
        When the master control process 150 calls IndexBuilder.GetActiveChunkList, the master control process 150 discovers that a new chunk 110 is available;
        The master control process 150 identifies the least loaded Index Servers in each row.
        When those Index Servers next call MCP.GetChunkManifest and MCP.GetActiveChunkList, the master control process 150 instructs them to:
            Get the new chunk from the Index Builder (2 Index Servers per row)
            Start actively issuing queries against the chunk (1 Index Server per row)

Index Server Failure
    Another common scenario will be the failure of an Index Serving Node. In that case, in one example, the master control process 150:
        Determines which chunk(s) 110 were being actively served by that node;
        Activate those chunk(s) on other nodes in the same row that already have backup copies of this chunk 110;
            This occurs when the relevant nodes issue their periodic call to MCP.GetActiveChunkList( );
        Determine which chunk(s) 110 were being held in a backup state on the failed node;
        Instruct other nodes in the same row to lazily retrieve those chunk(s) 110
            This occurs when the relevant nodes issue their periodic call to MCP.GetChunkManifest( )
    In some cases, such as the failure of multiple machines in the same row at once, there will be no backup copy of a chunk 110 inside the same row. When that occurs, the following steps can be taken.
        The master control process 150 can determine what machines in the row should be given the role of Active and Backup holders of this chunk 110.
        When those machines next call MCP.GetActiveChunkList( ) and MCP.GetChunkManifest( ) respectively, the master control process 150 can instruct them both to retrieve the chunk 110 from the appropriate indexer 120 and instruct one of them to start actively serving queries against the chunk 110.
        The master control process 150 can prioritize the transfer of the chunk 110 to the machine on which it will become active. Transfer of backup chunk(s) 110 generally takes lower priority than restoring an active copy of the chunk 110 to each row.
    In some cases the indexer 120 that contains a chunk 110 will not be available to serve up a copy of it. In that case, the master control process 150 can fall back on the following sources:
        Another Index Server in the same row.
        An Index Server in a different row.
    In one example, if an indexer 120 is available as a source for a chunk 110, it takes precedence over any Index Servers.

Aggregator Retrieves Content Chunk for Contextual Description
    A third scenario for finding chunks is when an aggregator and/or top level aggregator generates a contextual description that is shown to the user for each query result. In one example, the component responsible for contextual descriptions goes through the following steps.
1. Determine which Index Server holds the document by looking in a "document location cache";
2. Request the document from the appropriate Index Server;
3. If there is no entry in the cache, or if the Index Server returns "I don't have this document", then:
    a. Call MCP.QueryChunkLocation( ) to locate the chunk
    b. Get the document from the Index Server returned in the above call
    c. Add an entry to the document location cache Crawler Recovery A fourth scenario is when a crawler 130 machine has died and has been wiped or has been replaced with a new machine. In this scenario, the crawler 130 must ask the master control process 150 for its manifest. The master control process 150 can point the crawler 130 to the correct re-crawl chunk(s) 110.

File Sync Utility

In one example, the system 100 can employ a file sync utility. The file sync utility is the tool which actually copies chunk(s) 110 (e.g., and other information) onto machines in the system 100. In principle, machines call an interface on the file sync utility which files (e.g., chunk(s) 110) they need. The file sync utility finds the files and places them on the machine.

Re-Crawl Controller 160

The re-crawl controller 160 is responsible for determining when to retire chunk(s) 110 that are due to be re-crawled. For example, the re-crawl controller 160 can make a re-crawl decision on chunk(s) 110 based on information about the chunk 110, attempt not to starve any chunk(s) 110 and/or attempt not to expire chunk(s) 110 too fast so that the index becomes full of duplicates.

Retirement Decision

A common scenario is for the re-crawl controller 160 to make a retirement decision. By making this decision the re-crawl controller 160 is marking a chunk 110 to be re-crawled. For example, the re-crawl controller 160 can:

Employ chunk 110 metadata to make a decision on what should be retired. For example, class, date created, and/or state can be useful variables.

Mark the chunk 110 as retired in the chunk map 140.

Crawler 130 Communication with the Master Control Process 150

In one example, once a chunk 110 has been marked for retirement, the crawler 130 can find out that it is retired by communicating with the master control process 150 (e.g., based upon a period request about chunk(s) 110 for which the crawler 130 is responsible). For example, the crawler 130 can employ the MCP.GetChunkManifest( ) interface discussed previously. The interface returns detail(s) on chunk(s) 110 for which the crawler 130 is responsible. The crawler 130 can review the information received from the interface to determine whether any chunk(s) 110 are in the state of retired which the crawler 130 does not yet know.

Locating a Chunk 110

For example, if the crawler 130 determines (e.g., based on the information that it gets back from the master control process 150) that it needs to re-crawl a retired chunk 110 it can:

Use the MCP.QueryChunkLocation( ) API discussed previously to request the content chunk of the chunk 110 that has been retired;

The master control process 150 can return to the crawler 130 one or more locations from where the chunk(s) 110 can be acquired. Often, the chunk 110 will be located on an indexer 120 which is on the same pod as the crawler 130;

The crawler 130 can employ the file sync utility to move this chunk 110 to its machine;

Once the content chunk 110 has been acquired, the crawler 130 can parse the chunk 110 for URL(s) and re-crawl them;

Once the URL(s) have been parsed by the crawler 130, the chunk 130 can be destroyed.

Thus, in this example, chunk(s) 110 are not modified. When a chunk 110 is re-crawled, the old chunk 110 is destroyed and a new chunk 110 is created.

In one example, in order to help measure whether URL(s) are being lost, an expiration date can be added to a URL Frontier file for re-crawl. The presence of expiration date implies that this is a URL that did not make back into a chunk 110.

Chunks and Incremental Crawl

As defined above a chunk is a set of documents (e.g., 64K) that are manipulated as a unit. The cached copy of a chunk can be stored as a single compressed file. In one example, the size of this file is approximately 640 MB (64K documents*20,000 Bytes/document/compression factor). The index file for the chunk is approximately 128 MB (64K documents*700 words/doc*2.8 bytes/word).

Once the index is on the index serving nodes it goes through a process to warm up its cache and then serves queries to end users. Over time the data on an index serving node becomes stale. For example, there will be an index serving node that will have a copy of the index of news domains that change very often. The index serving nodes needs to get a copy that is as recent as possible. The index serving node might also have a copy of a document which has not been modified in five weeks. The system 100 facilitates obtaining a new copy of the news domains without emphasis upon obtaining a new copy of the document which has not been modified in five weeks.

Thus, in accordance with an aspect of the present invention, the system 100 is based, at least in part, upon the premises that pages don't change at the same rate. The re-crawl can be optimized by grouping pages into different buckets and then making each chunk contain only URL's for a single bucket. Each bucket would have a different re-crawl frequency. For example, there could be buckets called daily, weekly, and monthly. Every day the daily buckets are re-crawled, $1/7^{th}$ of the weekly and $1/30^{th}$ of the monthly. The two primary factors used to determine re-crawl frequency will be past modification history and static page rank.

Process for Incremental Crawl

The system 100 maintains a "map" of the chunk(s) 110 in the system 100 and the status of that chunk (e.g., live, building, crawling etc.). Periodically, the re-crawl controller 160 marks a certain number of chunk(s) 110 to be re-crawled. The decision of which chunks to re-crawl can be made using metadata that associated with the particular chunk 110.

Determining the Crawl Frequency of a Page

In order to determine the crawl frequency of a page, several items can be taken into account. For example, a value of the page (e.g., rank and/or click through rate etc.) and/or the probability that the document has changed.

Sample Incremental Crawl

In this example, URLs A-Z split into chunks of 4 documents each.

Day 1, Initial State of Chunks:

| Chunk # | Target TTL | URLs |
|---|---|---|
| 1 (daily) | day 2 | A, B, C, D |
| 2 (weekly) | day 3 | E, F, G, H |
| 3 (weekly) | day 3 | I, J, K, L |
| 4 (weekly) | day 4 | M, N, O, P |

Day 2:

Re-crawl chunk #1 and discover additional URLs. URLs C and D have not changed and the re-crawl controller 160 determines they should be moved to a weekly updated chunk.

| Chunk # | Target TTL | URLs |
|---|---|---|
| 1 deleted | — | — |
| 2 (weekly) | day 3 | E, F, G, H |
| 3 (weekly) | day 3 | I, J, K, L |
| 4 (weekly) | day 4 | M, N, O, P |
| 5 (daily) | day 3 | A, B, Q, R |
| 6 (weekly) | day 9 | C, D |
| 7 (daily) | day 3 | S, T, U, V |

Day 3:

Re-crawl chunks 2, 3, 5, 7. Since chunk 1 is no longer being used it can now be reused. J is not found in the re-crawl. Note that URLs that are re-crawled may move chunks, but still have the same update frequency: (S, T, U, V) split over two daily chunks.

| Chunk # | Target TTL | URLs |
|---|---|---|
| 1 (daily) | day 4 | A, F, Y, Z |
| 2 deleted | — | — |
| 3 deleted | — | — |
| 4 (weekly) | day 4 | M, N, O, P |
| 5 deleted | — | — |
| 6 (weekly) | day 9 | C, D |
| 7 deleted | — | — |
| 8 (daily) | day 4 | E, I, W, X |
| 9 (weekly) | day 11 | G, H, K, L |
| 10 (daily) | day 4 | B, Q, R, U |
| 11 (daily) | day 4 | S, T, V |

It is to be appreciated that the system 100, the chunk(s) 110, the indexer 120, the crawler(s) 130, the chunk map 140, the master control process 150 and/or the re-crawl controller 160 can be computer components as that term is defined herein.

Figure 2:
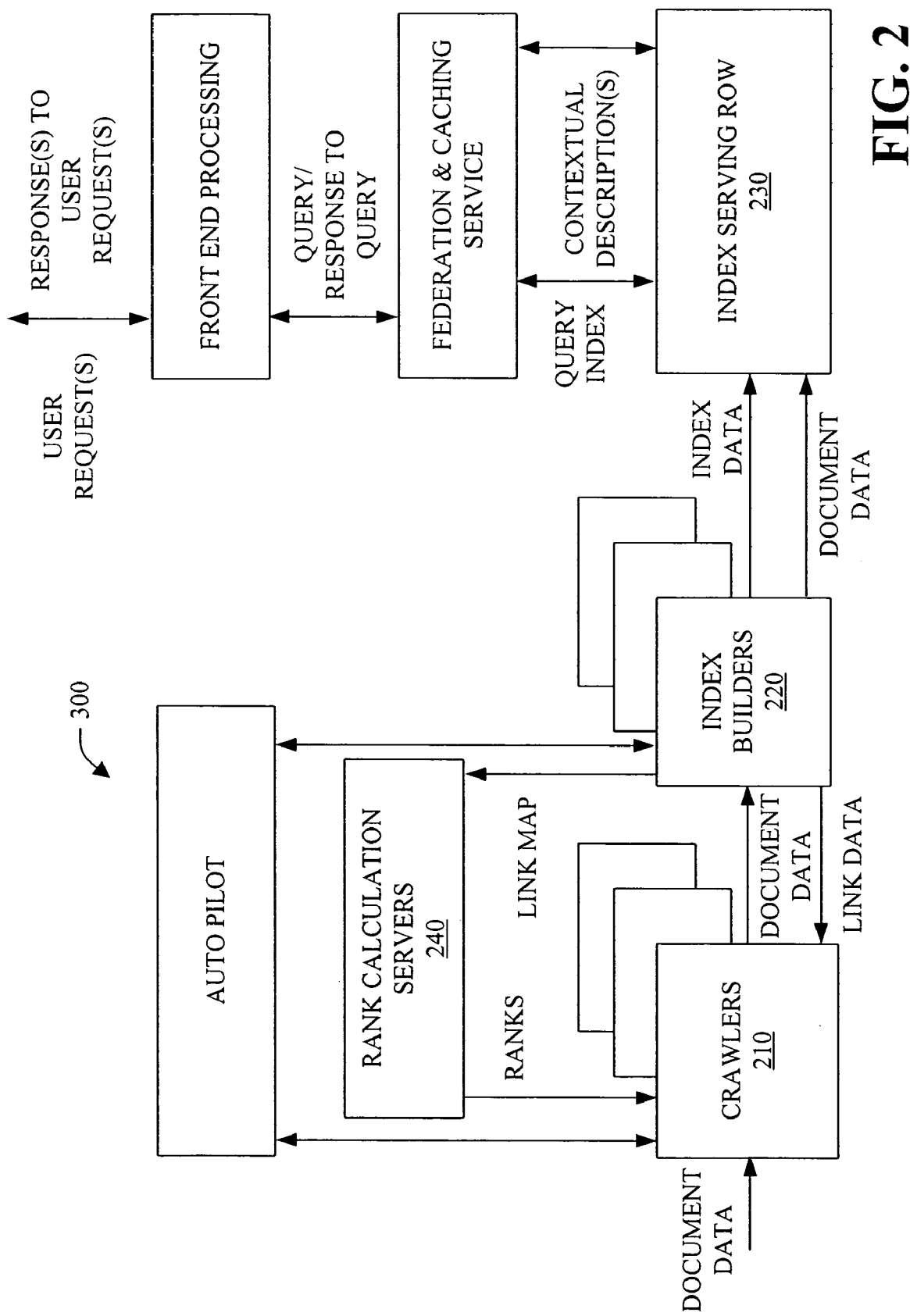
FIG. 2 is a block diagram of a web crawler system in accordance with an aspect of the present invention.

Next, turning to FIG. 2, a web crawler system 200 in accordance with an aspect of the present invention is illustrated. The system 200 includes crawlers 210, index builders 220, index serving row 230 and rank calculation servers 240. In this example, a particular crawler 210 is generally responsible for crawling a specific set of URLs (e.g., for performance reasons). The specific URL's that a crawler 210 is responsible for can be based, at least in part, on a hashing algorithm (e.g., 80-bit CRC hash values).

The index builders 220 are responsible for parsing pages and finding new URLs. The index builders 220 are aware of the "crawling scheme" and pass newly found URL's to the correct crawler 210 based on the crawling scheme, The index builders 220 can are also responsible for passing data structures such as the Web Map to the rank calculation servers 240 and the Index File Format to the Index Serving row 230.

In this example, the crawlers 210 maintain state about URLs that have been crawled while the indexer builders 220 do not maintain state.

When a parsed URL is found by an index builder 220, it passes it to a particular crawler 210 to be crawled. The particular crawler 210 that it passes the URL to is determined by the crawling scheme. In one example, the crawling scheme works as follows. Each domain is hashed. All the hashes are taken and divided into a set of partitions where the number of partitions is, for example, approximately ten times the number of crawlers 210 so that partitions can easily be moved between crawlers 210 to balance the load. Each crawler 210 is responsible for a set of partitions.

The requirement for the crawling scheme is that it be done in such a way that each crawler has nearly the same load on it and maintains the same average download speed as all other crawlers.

The information about what crawler is responsible for what partition and how to locate that machine can be contained within an .INI file. The .INI file can be made available to any machine that needs to pass URL's to a crawler 210 (e.g., index builder 220, index serving node).

Crawler 210 Files

In one example, files are at the core the search system. This is done primarily for performance as the file structures are highly optimized for the functionality needed. The following four files are relevant to the index creation system: crawled file structure, URL seen file, URL frontier file and URL received file.

Crawled File Structure

The crawled file structure is transmitted from the crawler 210 to the index builder 220. This file is written by the crawler 210 and placed on disk where it is read by the index builder 220. The HTTP Response header, additional metadata (e.g., IP Address downloaded from) and the raw document content are bundled up and placed into the crawler file structure. The data is compressed (e.g., using zlib). Generally, the crawler 210 does not do any parsing of the document before passing it to the index builder 220.

In one example, the crawled file structure is substantially similar to a content chunk file as described below (e.g., FIG. 6). In this example, the crawled file structure includes approximately 1000 documents at a time (e.g., passed between the crawler 210 and the index builder 220). The index builder 220 builds chunks around 64K documents in size.

Referring briefly to FIG. 3, an exemplary file 300 that the crawler 210 passes to the index builder 230 in accordance with an aspect of the present invention is illustrated.

URL Seen File

The URL seen file is a list of hashes for URLs that have been visited. For a URL, the file also contains other data such as the chunk that the URL belongs to, the last time it was downloaded, anchor text, rank, size, type, etc. The URL seen file can be kept to ensure that duplicates are not crawled and/or as a place to store other related metadata about a URL including, for example, anchor text and rank. In one example, the URL seen file is stored within the crawler and is not moved to other location(s).

URL Frontier File

The URL Frontier is the URLs that the crawler 210 intends to crawl, but has not yet done so because the number of URL's is too numerous to hold in memory. There can be multiple URL Frontier files partitioned by download priority. The download priority can be computed based on rank and other factors. In one example, the URL frontier file is stored within the crawler and is not moved to other location(s).

URL Received File

The URL received file is sent to the crawler by the following machines/processes:

Index Builder 220—provides newly found URL(s) and ACK URL(s);

Submission server—outside URL submission(s)

Figure 4:
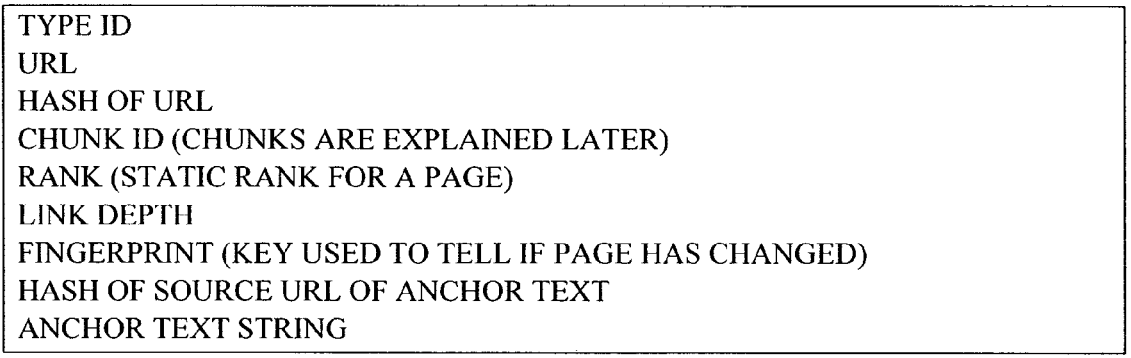
FIG. 4 is a diagram of an exemplary file format of a URL received file sent from an index builder to a crawler in accordance with an aspect of the present invention.

The URL received file is sent to the appropriate crawler 210 based on the crawling scheme. Turning briefly to FIG. 4, an exemplary file format 400 of the URL received file sent from an index builder 220 to a crawler 210 in accordance with an aspect of the present invention is illustrated.

It is to be appreciated that the system 200, the crawler(s) 210, the index builder 220, the index serving row 230 and/or the rank calculation servers 240 can be computer components as that term is defined herein.

Figure 5:
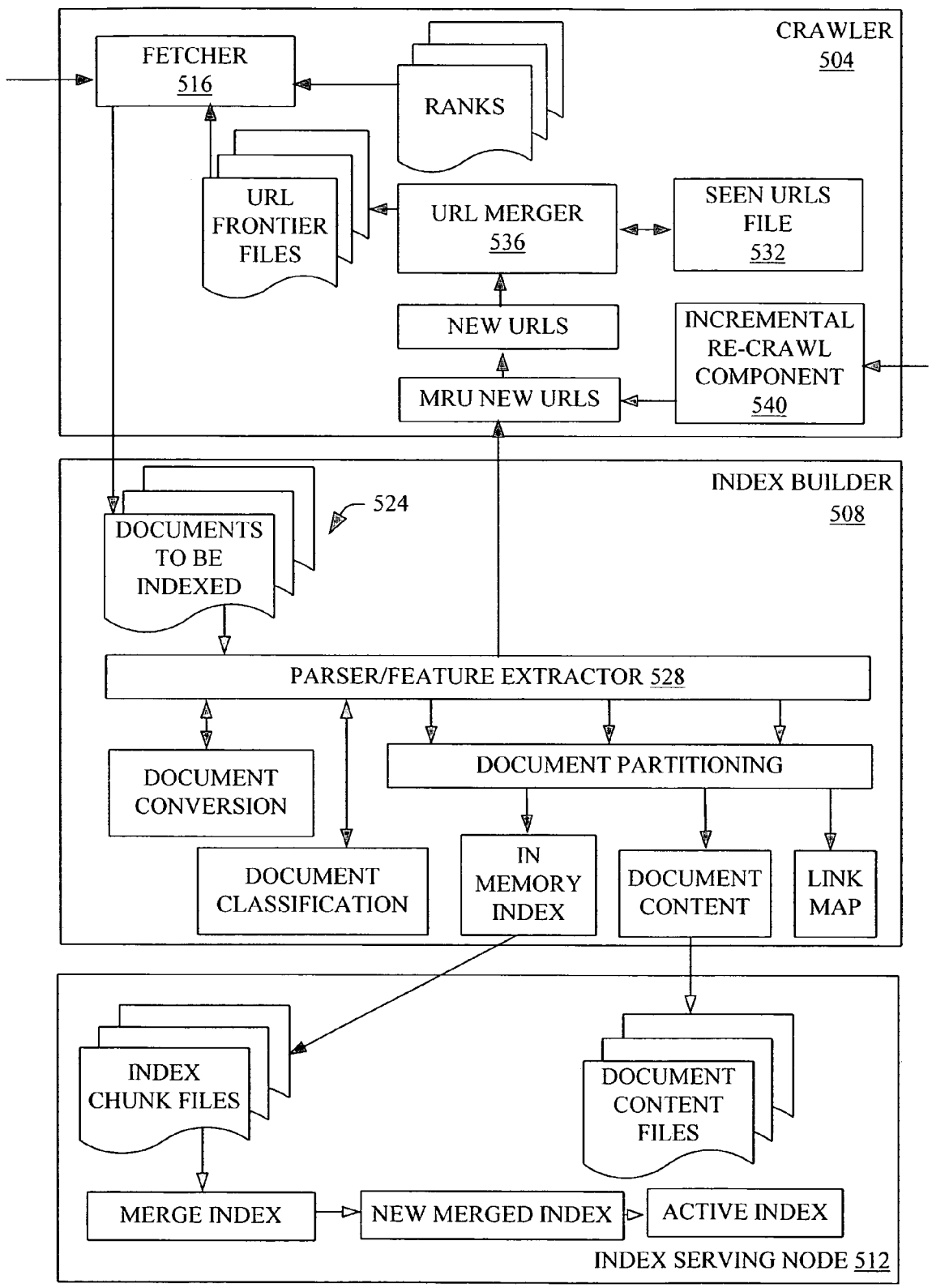
FIG. 5 is a block diagram of a web crawler system in accordance with an aspect of the present invention.

Referring to FIG. 5, a web crawler system 500 in accordance with an aspect of the present invention is illustrated. The system includes crawler(s) 504, index builder(s) 508 and index serving node(s) 512.

The crawler(s) 504 includes a fetcher 516 that retrieves URLs from URL Frontier File(s) 520 and fetches the content of the page. The crawler(s) 504 can receive URLs based on URLs found by the index builder 508, URL submission(s) and/or re-crawl URLs. The fetcher 516 can be responsible for politeness, DNS caching and/or maintaining robots.txt information. A retrieved document is sent to the Indexer nodes in a file 524, for example, in a crawled file structure.

URL's Found by the Index Builder 508

The index builder 508 is responsible for parsing the document(s) it is passed by the crawler(s) 504. A parser/feature extractor 528 parses the document(s). While parsing these documents the parser/feature extractor 528 can find URLs which can be passed to the crawler 504, for example, in a file called the URL Discovered file. The URL Discovered file is received by the crawler 504 and is merged with the URL seen file 532 by an URL merger 536. If the URL is in the URL seen file 532 only the metadata (e.g., as anchor text) is retained. If it has never been seen before, the URL with the metadata is placed in the URL seen file 532 and the URL frontier file(s) 520.

When the URL is crawled, the metadata from the URL frontier file along with the file downloaded are placed in a document file which will become part of a content chunk. The content chunk can be sent and/or picked-up the index builder 508 thereafter.

URL Submissions

A URL can be submitted, for example, by an end user. The submitted URL(s) are passed to the crawler 504 in a file called the URL Discovered file. The URL Discovered file is received by the crawler 504 and is merged with the URL seen file 532. If the URL has been seen before it is discarded (e.g., without merging of metadata). If it has not been seen before, the URL with the metadata is placed in the URL seen file 532 and the URL frontier file(s) 520.

When the URL is crawled, the metadata from the frontier file(s) 520 along with the file downloaded are place in a document file which will become part of a content chunk. The content chunk can be sent and/or picked-up the index builder 508 thereafter.

Re-Crawl URL's

The crawler 504 receives a content chunk that it is told to re-crawl (e.g., from a re-crawl controller 160 and/or via a master control process 150). An incremental re-crawl component 540 parses out the URL and anchor text from the content chunk and forms its own internal URL Discovered file. The URL Discovered file is merged with the URL seen file 532 by the URL merger 536. Since it is re-crawl, the URLs from the URL Discovered file should be in the URL seen file 532. The metadata (e.g., anchor text) can be merged. When the URL is crawled, the metadata from the frontier file(s) 520 along with the file downloaded are place in a document file which will become part of a content chunk. The content chunk will be picked up by the index builder at some point after that.

Acknowledgement: Seen URL Chunk

After the content is passed to the index builder 508, an index can be built for these documents. Additionally, the index builder 508 can build an URL Seen Chunk which contains hashes of all URL's in that chunk. The crawler 504 can receive this file and wipe the incremental anchor text from the URL seen file 532. The crawler 504 can also add the chunk information to the URL seen file 532, for example, to help reduces duplicates.

The URL Frontier file(s) 520 can also be acknowledged and entries from there removed similarly. In this example, implicit in this design is that there will be some loss of anchor text during the process. Anchor text that is added for a URL after it has been sent to the Index Builder, but before the URL has been acknowledged will be lost.

Data Paths—Failure Scenarios

Crawler Failed to Retrieve Document for Known Reasons

The crawler 504 can fail to receive document(s), for example, for known reasons such as:

Host does not exist;

HTTP Response Header indicates "remove"; and/or

Content Type is not wanted or is invalid

The crawler 504 can acknowledge the URL frontier file(s) 520 and does not pass anything for this URL to the index builder 508. The URL never makes it into a chunk and based on this the URL seen file 532 will age it out.

Index Builder Failed to Process a URL

In this scenario the index builder 508 is passed a URL that it fails to process. The URL is not placed in a chunk. Because of this the URL frontier file(s) 520 is not acknowledged nor is the URL seen file 532. Because the URL Frontier file(s) 520 is not acknowledged, the URL will eventually be re-crawled.

Index Builder 508 Crashes

Once the crawler 504 passes documents to the index builder 508, the crawler is unaware of processing on the document(s) until it receives an acknowledgement via the seen URL chunk. If the index builder 508 crashes, the crawler 504 will need to re-crawl the URL's that were lost. This can be accomplished by maintaining a timeout value for URL(s) in the URL frontier file(s) 520.

In normal circumstances the URL Seen Chunk is received before the timeout is reached. In this scenario the URL's will be removed from the URL frontier file(s) 520 when the URL Seen Chunk is received. In a crash scenario, the URL Seen Chunk for the URL's that were passed to the index builder 508 will not be received. In one example, the following occurs:

The URLs in the URL Frontier file(s) 520 timeout indicating that they have not been acknowledged; and, The URL Frontier file(s) 520 triggers a re-crawl of those URL's.

Crawler 504 Crashes

If the crawler 504 crashes, it is expected that the URL frontier file(s) 520 associated with the particular crawler 504 will be lost. The URL seen file 532 can be rebuilt using the URL Seen Chunks.

It is to be appreciated that the system 500, the crawlers 504, the index builders 508, the index serving nodes 512, the fetcher 516, the URL Frontier file, the crawled file structure 524 and/or the re-crawler controller 528 can be computer components as that term is defined herein.

Figure 6:
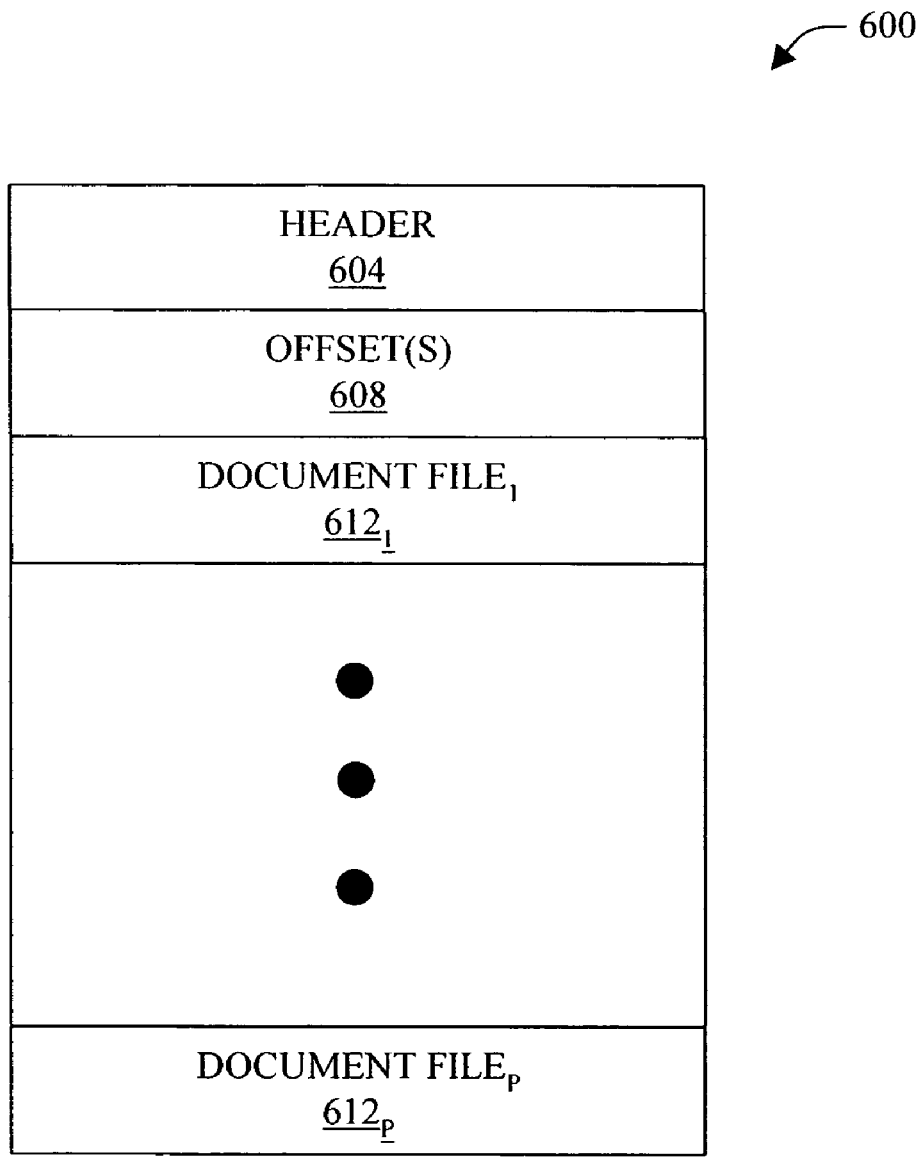
FIG. 6 is a diagram of an exemplary content chunk file in accordance with an aspect of the present invention.

Turning to FIG. 6, an exemplary content chunk file 600 in accordance with an aspect of the present invention is illustrated. The content chunk file 600 facilitates chunk encapsulation and contains the document content (e.g., for up to 65,536 URLs). At a high level the content chunk file is composed of three major areas: a chunk header 604 which contains metadata about the file; offset(s) 608 which are used to access a specific document entry in the file; and, document file(s) 612 which are actual html and non-html files.

In one example, some other important properties of the content chunk files are:

Contains between 1 and 64K document files (e.g., usually more than 1000);

File is binary;

File is considered to be compressed (e.g., using zlib)

The chunk header 604 can contain, for example, the following information: version information, a "magic number" which is basically a signature on the file (e.g., hexadecimal based); and/or the total number of document(s) in the content file 600.

In this example, offset(s) 608 are located after the header 604. The offset(s) 608 ensure that the file will be able to determine where documents start and end (e.g., even for the largest of files). The number of offsets is one more than the maximum number of documents. This is done so that there is a consistent way to find a file. The 'ith' document entry will always be between offset 'i' and offset 'i+1 '. The last offset is simply where the uncompressed length would begin and does not actually contain anything.

In one example, all 64K+1 entries are present even if there are fewer documents. If no document is present "0" can be used to denote that there is no document file at that location.

In one example, a document file 612 in a content file 600 can have three logical sections:

The first section is content metadata that does not exist as part of the document when it is downloaded from an HTTP Server; and, The second section of the document consists of the raw HTTP response headers; and, The third and final section consists of the raw content which follows the HTTP headers.

In one example, the document file 612 format can employ RFC-822 style headers. A line in the metadata section can have a name:value pair with a carriage return line feed (\r\n) at the end. After the document metadata section there will be a \r\n. Although the HTTP spec states that between the HTTP response header and the document there should be a \r\n, the system cannot control this and it may not be present. In this example, the first 4 bytes of the document is the uncompressed length of the document.

Figure 7:
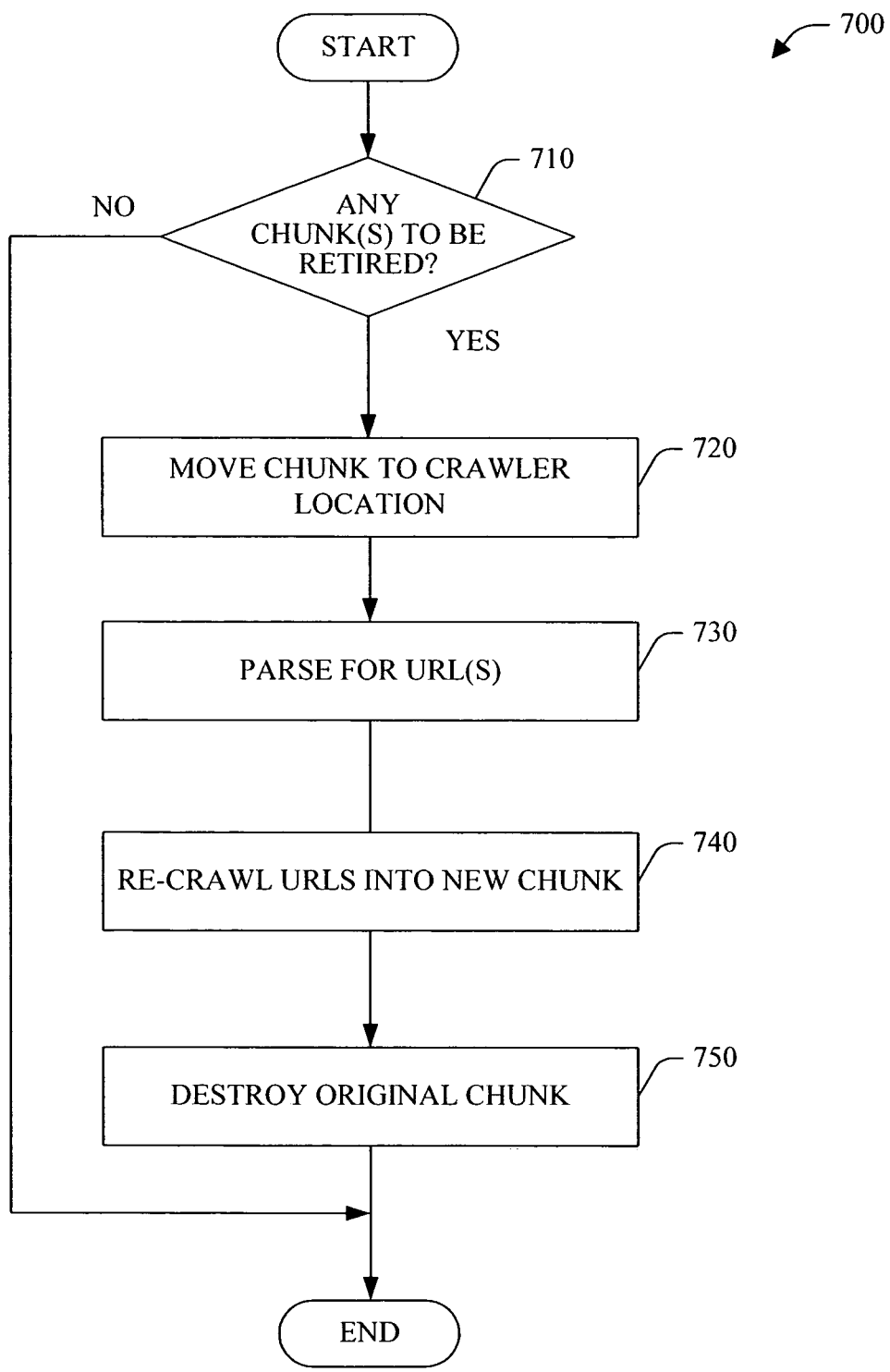
FIG. 7 is a flow chart of a method of performing document re-crawl in accordance with an aspect of the present invention.

Turning briefly to FIG. 7, a methodology that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 7, a method of performing document re-crawl 700 in accordance with an aspect of the present invention is illustrated. At 710, a determination is made as to whether any chunk(s) are to be retired (e.g., marked as retired by the re-crawl controller 160). If the determination at 710 is NO, no further processing occurs. If the determination at 710 is YES, at 720, the chunk is moved to the crawler location. At 730, the chuck is parsed for URLs. At 740, the URLs are re-crawled and a new chunk is formed. At 750, the original chunk is destroyed.

Figure 8:
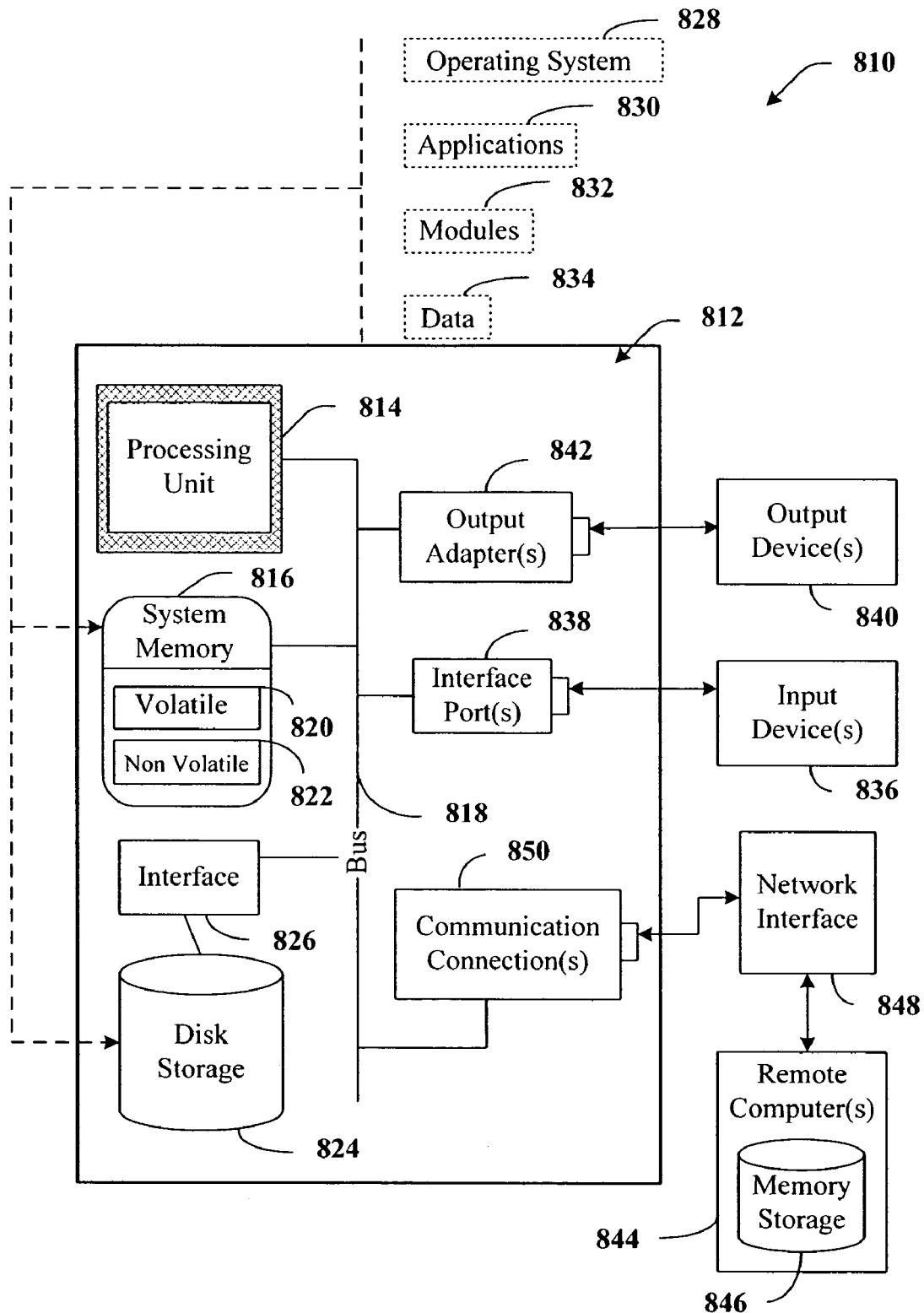
FIG. 8 illustrates an example operating environment in which the present invention may function.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates incremental web crawls comprising the following components stored in computer memory and executable by a processor:
   a selecting component that selects a first chunk from a group that includes at least one index chunk that stores information associated with an index of items, at least one rank chunk that stores at least one static rank associated with the at least one index chunk, at least one content chunk that stores cached copies of contents of pages crawled, at least one re-crawl chunk that stores a list of Uniform Resource Locators to be re-crawled, and at least one webmap chunk that stores at least a portion of a web map used for calculating the at least one static rank;
   a chunk map that stores properties associated with the first chunk and that is employed to determine the first chunk based on the stored properties, and wherein the stored properties include average time between change and average importance and are shared by all items in the first chunk;

a parsing component that parses the first chunk for Uniform Resource Locators;

a crawling component that re-crawls the Uniform Resource Locators;

a receiving component that
(1) receives one or more documents as a result of re-crawling the uniform resource locators,
(2) stores a document from the one or more documents in an appropriate chunk when it is determined that the document belongs to the appropriate chunk, and
(3) forms a second chunk separate from the first chunk based, at least in part, upon the re-crawled uniform resource locators when it is determined that the document does not belong to any chunk from the group, and storing the document in the second chunk.

2. The system of claim 1, wherein the items comprise information associated with a Uniform Resource Locator.

3. The system of claim 1, wherein the items comprise at least one of an HTML file, a PDF file, a PS file, a PPT file, an XLS file and a DOC file.

4. The system of claim 1, wherein the items are received from a crawler, and wherein the crawler is responsible for a specific set of Uniform Resource Locators.

5. The system of claim 1, further comprising a master control process that can modify the chunk map to facilitate load balancing amongst a plurality of crawlers.

6. The system of claim 1, further comprising a master control process that serves as an interface between a crawler and a re-crawl controller.

7. The system of claim 6, wherein the master control process maintains a known chunks table that stores information for components of the system.

8. The system of claim 6, wherein the master control process exposes an interface for communication with a component of the system.

9. The system of claim 8, wherein the interface returns a list of chunks the component should have and where to get the chunks.

10. The system of claim 8, wherein the interface returns a list of chunks that should be actively served by the component.

11. The system of claim 8, wherein the interface returns a range of chunk identifiers to use in building a new chunk by the component.

12. The system of claim 8, wherein the interface causes an old chunk to be retired by the system.

13. The system of claim 6, wherein the master control process facilitates movement of chunks from one component to another component.

14. The system of claim 13, wherein movement of chunks is based, at least in part, upon at least one of rebalancing index servers after one goes down, re-crawling pages previously crawled, and restoring a state of the crawler after it has crashed.

15. The system of claim 1, wherein the crawling component employs the chunk map to determine which chunks, if any, to re-crawl at a particular time.

16. The system of claim 1, further comprising an index chunk that stores information associated with an index of at least some of the items.

17. Computer-readable storage media having computer-useable instructions embodied thereon for performing a method of document re-crawl, the method comprising:

selecting a first chunk from a group that includes at least one index chunk that stores information associated with an index of items, at least one rank chunk that stores at least one static rank associated with the at least one index chunk, at least one content chunk that stores cached copies of contents of pages crawled, at least one re-crawl chunk that stores a list of Uniform Resource Locators to be re-crawled, and at least one webmap chunk that stores at least a portion of a web map used for calculating the at least one static rank, wherein a chunk map that stores properties associated with the first chunk is employed to determine the first chunk based on the stored properties, and wherein the stored properties include average time between change and average importance and are shared by all items in the first chunk;

parsing the first chunk for Uniform Resource Locators;

re-crawling the Uniform Resource Locators;

receiving one or more documents as a result of re-crawling the uniform resource locators;

storing a document from the one or more documents in an appropriate chunk when it is determined that the document belongs to the appropriate chunk; and, forming a second chunk separate from the first chunk based, at least in part, upon the re-crawled uniform resource locators when it is determined that the document does not belong to any chunk from the group, and storing the document in the second chunk.

18. The media of claim 17, wherein the method further comprises at least one of the following acts:

determining whether any chunks are to be retired;

moving the first chunk; and destroying the first chunk.

19. A method of performing document re-crawl comprising:

selecting, utilizing a first computing process, a first chunk from a group that includes at least one index chunk that stores information associated with an index of items, at least one rank chunk that stores at least one static rank associated with the at least one index chunk, at least one content chunk that stores cached copies of pages crawled, at least one re-crawl chunk that stores a list of Uniform Resource Locators to be re-crawled, and at least one webmap chunk that stores at least a portion of a web map used for calculating the at least one static rank, wherein a chunk map that stores properties associated with the first chunk is employed to determine the first chunk based on the stored properties, and wherein the stored properties include average time between change and average importance and are shared by all items in the first chunk;

parsing, utilizing a second computing process, the first chunk for Uniform Resource Locators;

re-crawling, utilizing a third computing process, the Uniform Resource Locators;

receiving one or more documents as a result of re-crawling the uniform resource locators:

storing a document from the one or more documents in an appropriate chunk when it is determined that the document belongs to the appropriate chunk; and, forming, utilizing a fourth computing process, a second chunk separate from the first chunk based, at least in part, upon the re-crawled uniform resource locators when it is determined that the document does not belong to any chunk from the group, and storing the document in the second chunk, wherein the first, second, third and fourth computing processes are performed by one or more computing devices.

20. The method of claim 19, further comprising periodically determining whether to re-crawl the Uniform Resource Locators based, at least in part, upon at least one of the average time between change and the average importance of documents comprising a particular chunk.

* * * * *